United States Patent
Farhoud et al.

(10) Patent No.: US 10,656,242 B2
(45) Date of Patent: May 19, 2020

(54) RADAR SENSOR

(71) Applicant: Hella KGaA Hueck & Co., Lippstadt (DE)

(72) Inventors: Ridha Farhoud, Laatzen (DE); Ernst Warsitz, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 422 days.

(21) Appl. No.: 15/514,716

(22) PCT Filed: Sep. 25, 2015

(86) PCT No.: PCT/EP2015/072090
§ 371 (c)(1),
(2) Date: Mar. 27, 2017

(87) PCT Pub. No.: WO2016/050629
PCT Pub. Date: Apr. 7, 2016

(65) Prior Publication Data
US 2017/0219690 A1    Aug. 3, 2017

(30) Foreign Application Priority Data
Sep. 29, 2014  (DE) .......................... 10 2014 114 107

(51) Int. Cl.
*G01S 7/02* (2006.01)
*G01S 7/03* (2006.01)
(Continued)

(52) U.S. Cl.
CPC .............. *G01S 7/023* (2013.01); *G01S 7/021* (2013.01); *G01S 7/03* (2013.01); *G01S 13/34* (2013.01);
(Continued)

(58) Field of Classification Search
CPC . G01S 7/023; G01S 7/03; G01S 7/021; G01S 7/36; G01S 7/34; G01S 13/34;
(Continued)

(56) References Cited

U.S. PATENT DOCUMENTS 5,280,288 A    1/1994  Sherry et al.
5,294,933 A *  3/1994  Lee .................... G01S 13/0209
                                                    342/159
(Continued)

FOREIGN PATENT DOCUMENTS

EP    1826586 A1    8/2007
EP    1873551 A1    1/2008

OTHER PUBLICATIONS

Luo, T. N., A 77-ghz CMOS Radar Transceiver with Anti-Interference Function.; In: IEEE Transactions on Circuits and Systems; vol. 60, No. 12, 2013, pp. 3247-3255.

*Primary Examiner* — Peter M Bythrow
*Assistant Examiner* — Helena H Seraydaryan
(74) *Attorney, Agent, or Firm* — Husch Blackwell LLP (57) ABSTRACT

A method for operating a radar sensor in which the radar sensor is provided with a signal generating device. The signal generating device generates an outgoing signal as a radar signal that is to be emitted. The radar sensor also includes a signal receiving device for receiving and processing received signals as reflected radar signals. The outgoing signal is generated within a predefinable frequency band. The received signals are monitored for the presence of an interference disruption. When an interference disruption has been detected, the frequency band for the generation of the outgoing signal is at least temporarily reduced in terms of the bandwidth.

8 Claims, 5 Drawing Sheets

(51) Int. Cl.
*G01S 13/93* (2020.01)
*G01S 13/931* (2020.01)
*G01S 13/34* (2006.01)
*G01S 7/36* (2006.01)

(52) U.S. Cl.
CPC ............... *G01S 13/931* (2013.01); *G01S 7/36* (2013.01); *G01S 2013/93271* (2020.01); *G01S 2013/93272* (2020.01); *G01S 2013/93274* (2020.01)

(58) Field of Classification Search
CPC ........... G01S 13/931; G01S 2013/9375; G01S 2013/9371; G01S 2013/9378; G01S 2013/9385
USPC ........................................................... 342/18
See application file for complete search history.

(56) References Cited

U.S. PATENT DOCUMENTS

| | | | |
|---|---|---|---|
| 2005/0179582 A1* | 8/2005 | Woodington | B60K 31/0008 342/70 |
| 2006/0125682 A1 | 6/2006 | Kelly, Jr. et al. | |
| 2007/0120731 A1* | 5/2007 | Kelly, Jr. | G01S 7/021 342/159 |
| 2007/0200747 A1* | 8/2007 | Okai | G01S 7/023 342/70 |
| 2008/0106458 A1* | 5/2008 | Honda | G01S 7/023 342/59 |
| 2012/0169523 A1 | 7/2012 | Lee et al. | |
| 2012/0176266 A1* | 7/2012 | Lee | G01S 7/023 342/27 |
| 2013/0342383 A1* | 12/2013 | Kojima | G01S 13/10 342/134 |

\* cited by examiner

RADAR SENSOR

CROSS REFERENCE

This application claims priority to PCT Patent Application No. PCT/EP2015/072090, filed 25 Sep. 2015, which itself claims priority to German Application No. 10 2014 114107.5, filed 29 Sep. 2014, the entirety of both of which are hereby incorporated by reference.

Field of the Invention

The invention relates to a radar sensor, in particular a radar sensor for a motor vehicle.

BACKGROUND OF THE INVENTION

Radar sensors are used in motor vehicles with increasing frequency. Such radar sensors are used, for example, in vehicle assistance systems in order to reliably detect oncoming traffic, or approaching vehicles, for example, at greater distances, and to be able to determine as precisely as possible their position and speed, or relative speed and azimuth angle. Radar sensors are also used to monitor the closer proximity of the motor vehicle.

Radar sensors are currently used that generate an outgoing signal, which is emitted, and receive and process the outgoing signal reflected by objects as an incoming signal. The outgoing signal is a series of individual signals having a predetermined time period and frequency, also referred to as a "burst," which vary in frequency from one individual signal to the next individual signal.

The radar sensors are operated, for example, with the so-called LFMSK transmission method (Linear Frequency Modulated Shift Keying). With this method, three nested individual singles A, B, C are emitted. For a time period of ca. 25 µs (burst) in each case, a constant frequency is emitted thereby, which is then modified linearly for each of the three individual signals. An increasing frequency is referred to as an up-chirp, and a decreasing frequency is referred to as a down-chirp. In addition to the up-chirp and the down-chirp, a mono-frequency individual signal, the so-called Doppler-chirp, is used.

Due to the limitation of the permissible frequency range for automotive applications, and the simultaneous increased used of such radar sensors, the probability increased that vehicles equipped with radar sensors will interfere with each other. In the event of such an interference, the receiver-side radar sensor (victim) also receives, in addition to its own outgoing signal, the outgoing signal of another radar sensor (disrupter).

This results in erroneous evaluations, when the outgoing signal of the disrupter is regarded as the reflected outgoing signal of its own radar sensor.

SUMMARY OF THE INVENTION

For this reason, it is the objective of the present invention to create a radar sensor that is an improvement on the prior art. A corresponding method for operating such a radar sensor is also to be created. It is also the objective to create a motor vehicle having at least one such radar sensor.

One exemplary embodiment of the invention relates to a method for operating a radar sensor, wherein the radar sensor is provided with a signal generating device, which generates an outgoing signal as a radar signal that is to be emitted, having a signal receiving device for receiving and processing received signals as reflected radar signals, wherein the outgoing signal is generated within a predefinable frequency band, wherein the received signal is monitored for the presence of an interference disruption, wherein when an interference disruption has been detected, the frequency band is reduced at least temporally in terms of its bandwidth in order to generate the outgoing signal. As a result, the mutually originally disrupting radar signals are displaced in bandwidths where they no longer cause disruptions, even when they are still present.

It is particularly advantageous thereby when the limited frequency band is reset to the original value of the bandwidth after a predefined time has elapsed, or when a predefined event has been detected. As a result, after an expected elimination of a disruption the available frequency band for generating the outgoing signal is again increased to the maximum possible bandwidth.

It is useful thereby when the detection of an interference disruption occurs through evaluation of a temporal derivation of the received signal. In this manner, pulse-like disruptions in particular can be readily detected.

It is also advantageous when the detection of an interference disruption occurs through evaluation of a standard deviation of a temporal derivation of the received signal.

It is particularly advantageous when the temporal derivation of the received signal is standard the disrupted interval is determined from the temporal derivation of the received signal and from the standard deviation of the temporal derivation of the received signal.

One exemplary embodiment of the invention relates to a radar sensor having a signal generating device, which generates an outgoing signal as a radar signal that is to be emitted, having a signal receiving device for receiving and processing received signals as reflected radar signals, wherein the outgoing signal lies within a predefined frequency band, wherein the received signals can be analyzed for interference disruptions, and when an interference disruption has been detected, the permissible frequency band for the outgoing signal can be limited.

One exemplary embodiment of the invention relates to a motor vehicle having numerous radar sensors, wherein with a limiting of the bandwidth for generating the outgoing signal in each radar sensor, a limiting of the bandwidth is initiated, wherein the remaining usable bandwidth of each radar sensor is different.

One exemplary embodiment of the invention also relates to a motor vehicle having numerous radar sensors, wherein with a limiting of the bandwidth for generating the outgoing signal in groups of radar sensors, a limiting of the bandwidth is initiated, wherein the remaining usable bandwidth of each group of radar sensors is different.

It is advantageous when one group of radar sensors is a group of radar sensors disposed on the right-hand side of the vehicle, and/or one group of radar sensors is a group of radar sensors disposed on the left-hand side of the vehicle, and/or one group of radar sensors is a group of radar sensors disposed at the front of the vehicle, and or one group of radar sensors is a group of radar sensors disposed at the back of the vehicle.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
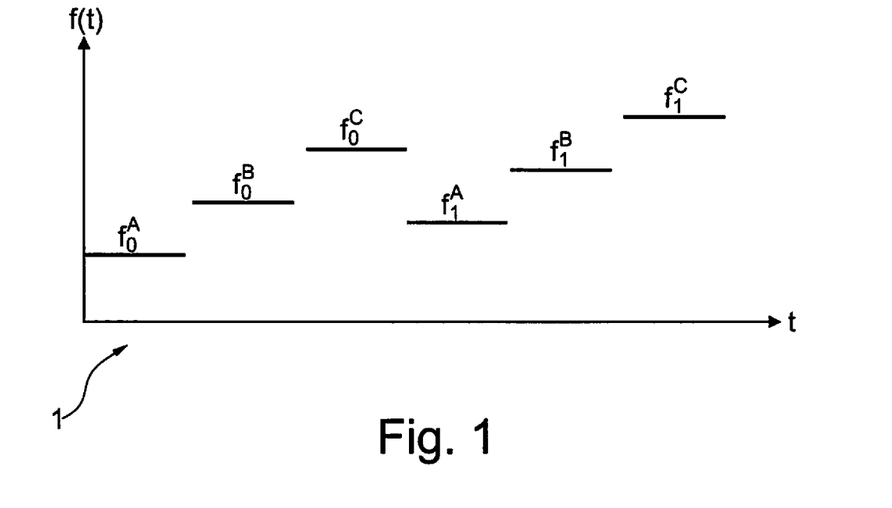
FIG. 1 shows a diagram with an outgoing signal.

FIG. 1 shows a diagram 1 illustrating an outgoing signal composed of a series of individual signals. The diagram shows the frequency f(t) of the outgoing signal as a function of time t. The individual signals $f_0^A$, $f_0^B$, $f_0^C$, $f_1^A$, $f_1^B$, $f_1^C$, etc. form a series that is emitted as an outgoing signal. If the radar sensor is operated with the so-called LFMSK transmission method (Linear Frequency Modulated Shift Keying), three nested individual signals A, B, C are emitted. A constant frequency is emitted thereby for a time period of ca. 25 μs (burst) in each case, which is then linearly modified for each of the three individual signals. It can be seen thereby that the frequencies of the signals $f_0^A$, $f_0^B$, $f_0^C$ increase, wherein the frequencies again increase in the next series of signals $f_1^A$, $f_1^B$, $f_1^C$, wherein the frequency $f_1^A$ is greater than the frequency $f_0^A$. An increasing frequency is referred to as an up-chirp, and a decreasing frequency is referred to as a down-chirp. In addition to the up-chirp and down-chirp, a mono-frequency individual signal, the so-called Doppler chirp, is also used. The three types of signal are used alternatingly thereby. FIG. 1 shows only up-chirps. Down-chirps or Doppler-chirps could also be used, however.

Figure 2:
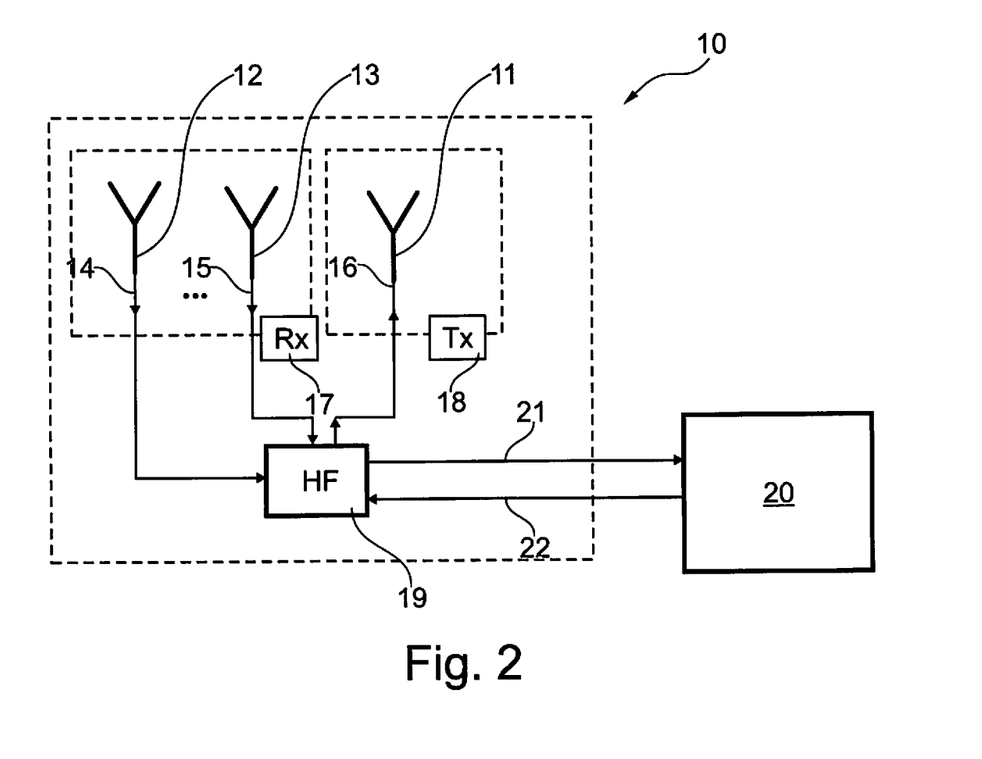
FIG. 2 shows a schematic depiction of a radar sensor.

FIG. 2 shows a schematic depiction of a radar sensor 10, having a transmitting antenna 11 and two receiving antennas 12, 13. The reflected, received signal 14, 15 is mixed in the receivers 17 with the outgoing signal 16 of the transmitter 18, and transformed in terms of the frequency range. This signal 21 is mixed in an HF element 19 and transferred to the digital signal processor 20 for further evaluation. The digital signal processor 20 transmits control signals 22 for controlling the radar sensor to the HF element. The radar sensor 10 thus has a signal generating device thereby, which includes the transmitter 16, the HF element 19 and the signal processor 20. The radar sensor also includes a signal receiving device thereby, which includes the receiver 17, the HF element 19 and the signal processor 20.

The received signal 14, 15 represents a superimposing of reflections of relevant targets thereby, but also reflections of undesired targets, which are also referred to in radar technology as clutter, so-called disruption echoes caused by reflections of the ground, shoulder construction and rain. The OS-CFAR method (Ordered Statistic-Constant False Alarm Rate) is used for detecting the relevant target. After detection, there is a base frequency signal for a relevant target, the frequency of which is obtained from the distance to the target and its relative speed. With a Doppler-chirp, the frequency is only dependent on the relative speed. The phase difference between the spectral components in the base band between two respective ramps is likewise obtained from the distance to and the relative speed of the relevant target. By solving a linear equation system, the distance to and the relative speed of the target can be determined for each measurement cycle from the frequency and this phase difference. Furthermore, the run-time difference of the reflected signal, and thus the angle of incidence, can be determined by means of the phase difference between the two receiving antennas at the location of the frequency that is to be evaluated.

Raw target parameters can be determined from these signals, using further data if applicable, which are used for identifying objects by means of subordinate processing steps. The signal level and/or a reliability of the generated values can be advantageously used as the further data.

Figure 3:
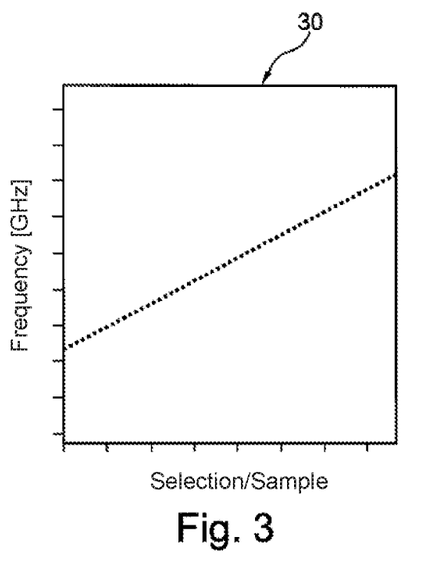
FIG. 3 shows a diagram of a signal curve.
Figure 4:
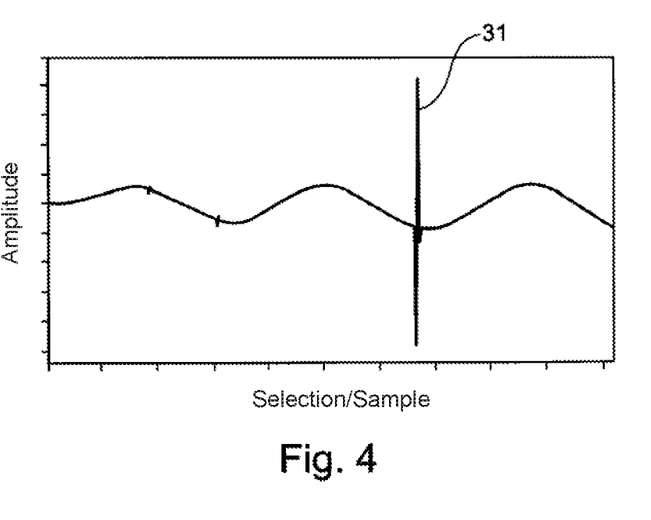
FIG. 4 shows a diagram of a signal curve.

FIGS. 3 and 4 show a signal curve 30 with a disruption. FIG. 3 shows an up-chirp in the frequency/time diagram, which is intersected by a CW disrupter. The CW disrupter results in a pulse-like increase 31 in the amplitude of the time signal in the region of the intersection of both signals, see FIG. 4. This increase 31, which can also extend over numerous measurement points, causes a broadband increase in the noise in the frequency range. Reflections from relevant targets are masked as a result, and can no longer be detected in the series.

The CW disruption is an example of a disruption thereby. Other disruptions can also occur. More complex disruptions may be caused, for example, by LFMCW (Linear Frequency Modulated Continuous Wave) and FCSM (Fast Chirp Sequence Modulation). With these disruptions, numerous intersections occur in the frequency curve between the outgoing signal of the victim and the disrupting signal. As a result, disruptions in the form of an amplitude increase may be received in numerous time windows, which increase the noise level such that a detection of relevant targets without correcting the receive signal becomes difficult.

Because the receiving antennas are subjected to different antenna diagrams due to manufacturing variances and asymmetrical couplings, the effects of the disruptions on the wanted signal may also be different in the two receiving antennas. In an exemplary case, only one of the two antennas is disrupted. Furthermore, depending on the disruption, either just one, or all three A-, B-, C-ramps may be affected. This may be attributed to the fact that the three ramps have different frequencies, and are temporally offset, see FIG. 1. Thus, by way of example, with a narrowband Doppler disrupter having the same Doppler frequency in the range of ramp A, the frequencies of only this ramp are strongly disrupted. The disruptions of the two other ramps are caused by the harmonics of the disrupter, and frequently cannot be detected, due to the low disruption intensity.

An LPC filtering method can be used for the detection and correction of discontinuities due to interferences. The prediction error is used as the test value for the detection thereby. After detection, the pulse-like disruptions are estimated using the preceding undisrupted signal values. The reduction of the interference disruption using the linear prediction is associated with a certain amount of computing expenditure due to the complex matrix operations.

In order to be able to process the target parameters of all of the objects detected by the radar within a provided time period in unfavorable traffic situations, it is preferred when complex signal processing algorithms are replaced with simple algorithms.

For the detection and correction of discontinuations due to interferences, newly developed methods composed of the FIND detection algorithm (Fast Impulsive Noise Detection) and the IABS method for connecting the interference disruptions (Interference Avoiding Band Selection) can be used. With these methods, the fact that a high number of substantially identical radar sensors, or similar radar sensors from the same manufacturer, are available and can be used in the 24 GHz range, which use the same transmission scheme, is exploited.

The disruptions should not be corrected thereby, but rather eliminated. This can be achieved when the disrupter and victim use different frequency bands. Because it is sufficient to detect the disruption in just one of the 6 ramps (3 ramps per receiving antenna), errors in signals can also be eliminated in which the disruption cannot be detected.

Figure 5:
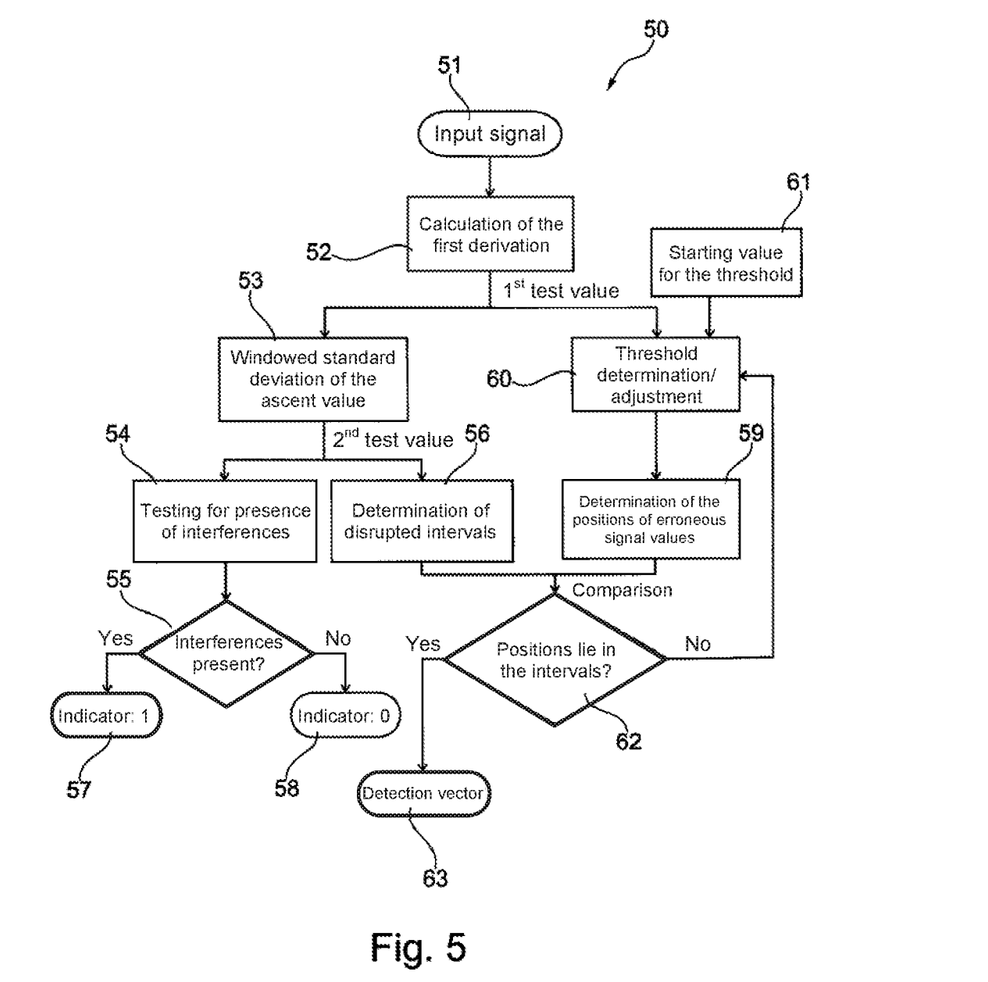
FIG. 5 shows a block diagram illustrating the method according to the invention.

The so-called FIND method is based on the evaluation of the statistical properties of the first derivation of the received signal. A block diagram 50 of this method is illustrated in FIG. 5.

Input signals are made available in block 51. The input signal is typically a sinusoidal signal or a signal composed mainly of a superimposing of numerous sinusoidal signals thereby, and on which disruptions are superimposed. The calculation of a first derivation of the input signal from block 51 occurs in block 52. The derivation of the received signal and the modification of its statistical properties are evaluated in short time intervals.

Two test values are used thereby. The slope value, or the derivation of the received signal from block 52 represent the first test value. The standard deviation of the derivation according to the determination in block 53 forms the second test value thereby.

The windowed standard deviation of the slope value according to block 53 should check for the presence of disruptions, while the first derivation itself is used in accordance with block 52 for determining the position of the error locations.

When checking for the presence of disruptions, the maximum value, the minimum value and the average value of the second test value is formed, see block 54.

The ratio between the difference of the average value and the minimal value to the difference of the maximum value and minimum value allows for conclusions regarding the continuity of the signal.

With pulse disruptions, which typically only occur in a small number of windows, the ratio described thereby is low. If this ratio is lower than a defined threshold of ⅓, the measurement is evaluated as disrupted, see block 55. There is a disruption in block 57, and there is no disruption in block 58.

Using a threshold value, the time interval in which there is a disruption can also be determined on the basis of this test value, see block 56.

The slope values of the signal, thus the first test values, are used to determine the positions when disruptions are present, see block 59. For this, a threshold value is defined in block 60, with which the individual disrupted samples can be located. The sum of the average value and one half of the standard deviation for this value are used as a starting value for this threshold value, see block 61. In the ranges in which the test value exceeds the threshold value, the value is set to one in a binary detection vector. In all of the other parts it remains at zero. Subsequently, it is checked whether all of the detected disruption locations lie exclusively in the associated intervals from the second test value, see block 62. If this is not the case, the threshold value is increased, and a further run is carried out. A tolerance of 20% is granted thereby. If the adaptive threshold value adjustment is concluded, the binary detection vector is released as the output value, see block 63. It is thus determined whether a disruption exists, and in which signal interval the disruption is present.

Figure 6:
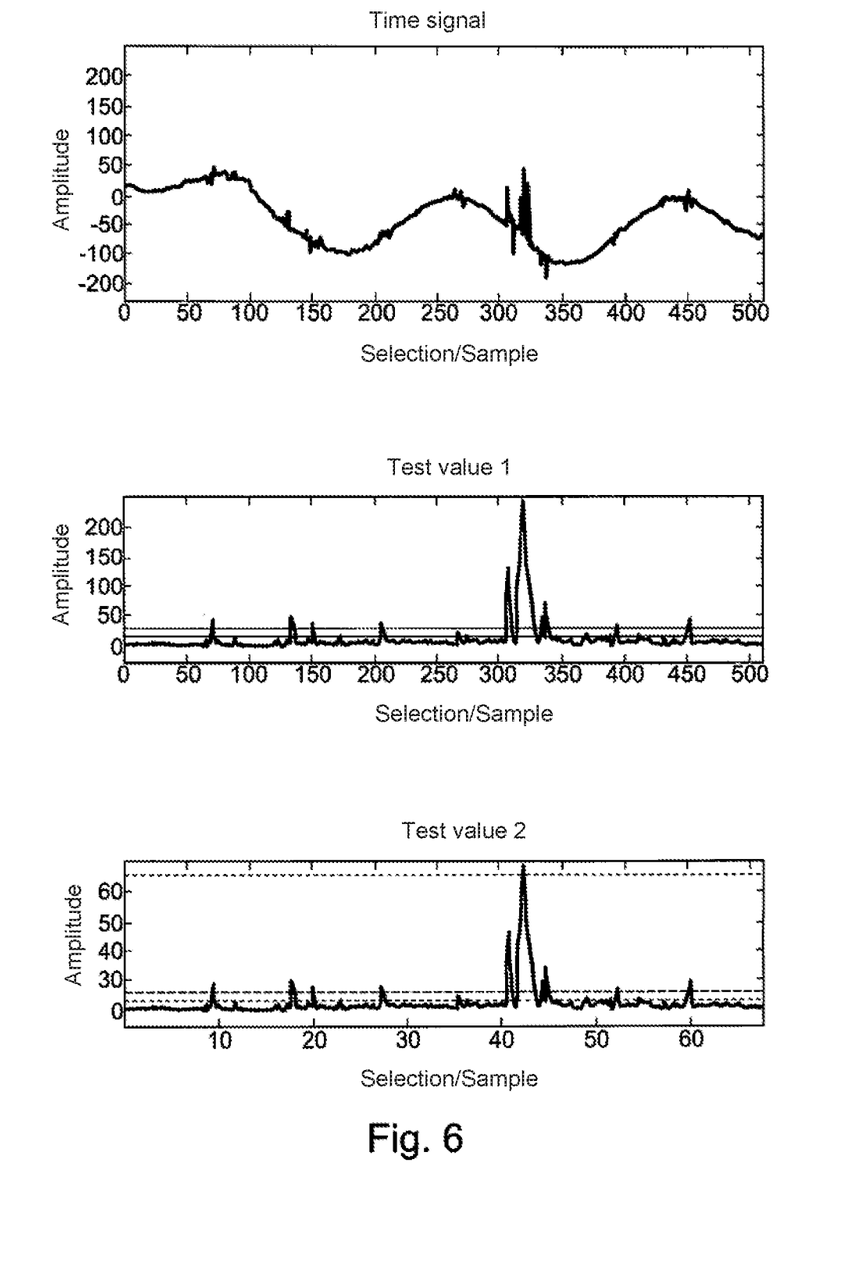
FIG. 6 shows a diagram illustrating the invention.

The illustrations in FIG. 6 show the disrupted input signal in the upper drawing. It is a sinusoidal function having pulse-like disruptions. The middle drawing shows the first test value, thus the first derivation. This is low or zero, except there where the disruptions are located. The lowest drawing in FIG. 6 shows the curve of the second test value, which show that the standard deviation is greatest at disruption m. It can thus be concluded that there is a disruption.

The method for eliminating interference disruptions shall be described below.

For the linear frequency modulation, there is ca. 200 MHz bandwidth available with the assumed radar system at 24 GHz. The inventive concept thereby is to use this bandwidth differently in the detection of an interference or disruption, depending on the mounting or installation position of the radar sensor. With the configuration of the use of these frequency bands, it is assumed that the disrupter itself is a victim of interference disruption, and that both radar sensors are 24 GHz radar sensors from the same manufacturer.

Figure 7:
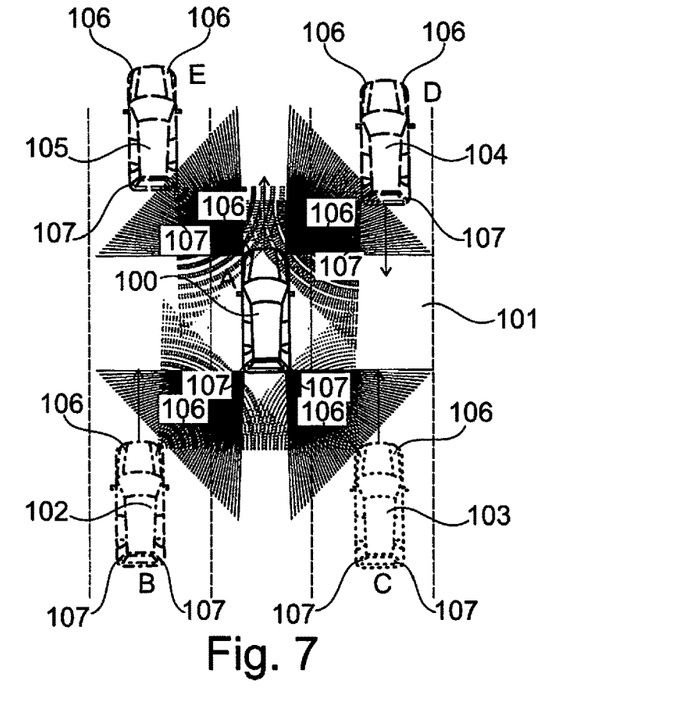
FIG. 7 shows a vehicle in its environment.

In FIG. 7 the interference disruption is illustrated based on a typical traffic scenario. The surroundings of a vehicle 100 on a roadway 101 are depicted. A total of five vehicles 100, 102, 103, 104 105 is depicted, each of which are located in front of or behind the vehicle 100, and displaced to the right or left.

The vehicles are each equipped with front radar sensors 106 and rear radar sensors 107, and emit radar beams or radar signals at the front and rear in the form of output signals. There are two radar sensors 106 disposed at the front corners of the vehicle for the front system, and two other radar sensors 107 disposed at the rear corners of the vehicle for the rear system.

In the example in FIG. 7, the front sensor 106 of vehicle 102 disrupts the left-hand rear sensor of vehicle 100 and is disrupted itself by this sensor. Further disruptions can be derived from the drawing. Interference disruption occurs thereby where vehicles detect each other. This being with the diagonal radar signals of a radar sensor that are received by another radar sensor.

Figure 8:
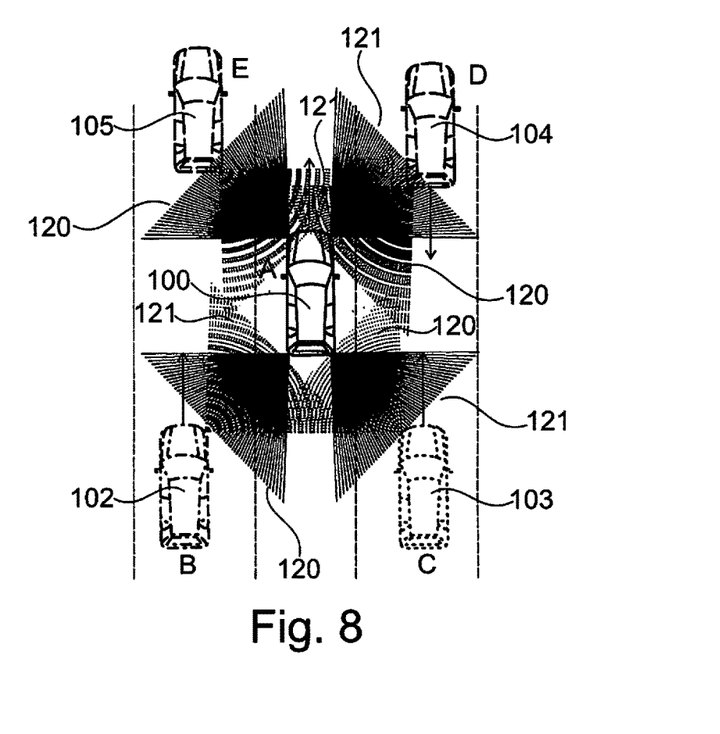
FIG. 8 shows a vehicle in its environment.

In order to prevent interference disruptions in such traffic scenarios, as soon as a disruption is detected, only a portion of the aforementioned frequency range is available to a radar sensor. The radar sensor is thus controlled such that the frequency band available for generating the output signal, or outgoing signal, is limited. The permitted usable frequency band can be selectively defined, for example, in an upper or lower range. By way of example, the lower frequency band is provided thereby for all of the sensors on the right-hand side of the vehicle. The upper frequency band is used by the sensors mounted on the left-hand side of the vehicle, see FIG. 8. The ranges of the emitted radar signals 120 are in the upper frequency band, and the ranges 121 are in the lower frequency band. As a result, there is no more overlapping of ranges in the same frequency band. It can be seen from the depiction according to FIG. 8 that based on this frequency band distribution, the sensors can no longer disrupt each other. Moreover, there still exists a reciprocal detection of the vehicles. But because this detection occurs with different respective frequency bands, there is no interference disruption.

Because interference disruptions normally only occur in a limited time interval, they occur when the vehicles having the radar sensors are located in corresponding proximities and orientations, such that the disrupter is basically in the "field of vision" of the victim antennas.

Because this time interval is normally limited, and typically is not very long, the time period of the limitation, or the subdivision of the usable frequency band of the respective radar sensors can be limited, such that after a predefined time period has elapsed, the usable frequency band can again be enlarged to the original frequency band.

This time period is approximately 60 seconds, for example, after the initial detection of an interference disruption.

LIST OF REFERENCE SYMBOLS 1 diagram
10 radar sensor
11 transmission antenna
12 receiving antenna
13 receiving antenna
14 signal
15 signal
16 outgoing signal
17 receiver
18 transmitter
19 HF element
20 signal processor
21 signal
22 control signal
30 signal curve
31 slope
50 block diagram
51 block
52 block
53 block
54 block
55 block
56 block
57 block
58 block
59 block
60 block
61 block
62 block
63 block
100 vehicle
101 roadway
102 vehicle
103 vehicle
104 vehicle
105 vehicle
106 front radar sensor
107 rear radar sensor
120 radar signal
121 range

The invention claimed is:

1. A method for operating a radar sensor, wherein the radar sensor is provided with a signal generating device which generates an outgoing signal as a radar signal that is to be emitted, said radar sensor also including a signal receiving device for receiving and processing received signals as reflected radar signals, the method comprising the steps of:
the signal generating device generating the outgoing signal within a predefined frequency band,
monitoring the received signals received via the signal receiving device for the presence of an interference disruption, said monitoring comprising:
generating test values from a standard deviation of a temporal derivation of the received signal,
forming a minimum value, an average value, and a maximum value of the test values, and
determining the interference disruption is present when a ratio of a difference of the average value and the minimum value to a difference of the maximum value and the minimum value is lower than a predefined threshold value, and
when the interference disruption is detected, reducing the frequency band for generating the outgoing signal in terms of the bandwidth.

2. The method according to claim 1, further comprising the step of resetting the frequency band to the predefined frequency band after a predefined time has elapsed or after a predefined event has been detected.

3. The method according to claim 1, wherein said monitoring for the presence of the interference disruption further comprises determining a position of the interference disruption through evaluation of the temporal derivation of the received signal.

4. The method according to claim 1, wherein a disrupted interval is determined from the standard deviation of the temporal derivation of the received signal and from the temporal derivation of the received signal.

5. A radar sensor comprising:
a signal generating device which generates an outgoing signal as a radar signal that is to be emitted;
a signal receiving device for receiving and processing received signals as reflected radar signals,
wherein the outgoing signal lies within a predefined frequency band,
wherein said processing the received signals comprises:
generating test values from standard deviations of temporal derivations of the received signals,
forming minimum values, average values, and maximum values of the test values, and
determining interference disruptions are present when a ratio of a difference of the average values and the minimum values to a difference of the maximum values and the minimum values is lower than a predefined threshold value, and
wherein when an interference disruption has been detected, the signal generating device limits the frequency band for the outgoing signal.

6. A motor vehicle having numerous radar sensors according to claim 5,
wherein a limitation of the bandwidth of each radar sensor is initiated with a limitation of the bandwidth for generating an outgoing signal,
wherein the remaining usable bandwidth of each radar sensor is different.

7. The motor vehicle having numerous radar sensors according to claim 5,
wherein a limitation of the bandwidth in groups of radar sensors is initiated with a limitation of the bandwidth for generating the outgoing signal,
wherein the remaining usable bandwidth of each group of radar sensors is different.

8. The motor vehicle according to claim 7, wherein at least one of:
one group of radar sensors is a group of radar sensors disposed on the right-hand side of the vehicle,
one group of radar sensors is a group of radar sensors disposed on the left-hand side of the vehicle,
one group of radar sensors is a group of radar sensors disposed at the front of the vehicle,
one group of radar sensors is a group of radar sensors disposed at the rear of the vehicle.

* * * * *

UNITED STATES PATENT AND TRADEMARK OFFICE
CERTIFICATE OF CORRECTION

PATENT NO. : 10,656,242 B2
APPLICATION NO. : 15/514716
DATED : May 19, 2020
INVENTOR(S) : Ridha Farhoud It is certified that error appears in the above-identified patent and that said Letters Patent is hereby corrected as shown below:

In the Specification

In Column 2, Lines 26-30, delete "It is particularly advantageous when the temporal derivation of the received signal is standard the disrupted interval is determined from the temporal derivation of the received signal and from the standard deviation of the temporal derivation of the received signal." and replace with -- It is particularly advantageous when the disrupted interval is determined from the temporal derivation of the received signal and from the standard deviation of the temporal derivation of the received signal. --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*